(12) United States Patent
Hewes et al.

(10) Patent No.: US 8,923,902 B2
(45) Date of Patent: *Dec. 30, 2014

(54) MOBILE MESSAGING SHORT CODE TRANSLATION AND ROUTING SYSTEM AND METHOD

(75) Inventors: Gerald Hewes, Lexington, MA (US); Boon Hwang, San Rafael, CA (US); Michael Pirie, Redmond, WA (US); Randall Snyder, Las Vegas, NV (US)

(73) Assignee: M-Qube, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,480

(22) Filed: Mar. 29, 2012

(65) Prior Publication Data

US 2012/0244892 A1 Sep. 27, 2012

Related U.S. Application Data

(63) Continuation of application No. 10/556,963, filed as application No. PCT/US2004/015434 on May 17, 2004, now Pat. No. 8,155,677.

(60) Provisional application No. 60/471,016, filed on May 16, 2003.

(51) Int. Cl.
*H04W 4/12* (2009.01)
*H04W 88/18* (2009.01)
*H04W 8/26* (2009.01)
*H04W 4/14* (2009.01)

(52) U.S. Cl.
CPC .............. *H04W 88/184* (2013.01); *H04W 8/26* (2013.01); *H04W 4/14* (2013.01)
USPC ........................ 455/466; 455/414.1; 455/450

(58) Field of Classification Search
USPC ............ 455/414.1, 466, 450, 404.2; 709/206, 709/238
See application file for complete search history.

(56) References Cited

U.S. PATENT DOCUMENTS

| | | | |
|---|---|---|---|
| 6,172,981 B1 * | 1/2001 | Cox et al. ...................... | 370/401 |
| 6,996,409 B2 | 2/2006 | Gopinath et al. | |
| 7,231,431 B2 * | 6/2007 | Sofer et al. ..................... | 709/218 |
| 7,558,861 B1 * | 7/2009 | Qidwai et al. ................ | 709/227 |
| 2004/0165569 A1 * | 8/2004 | Sweatman et al. ............ | 370/349 |
| 2004/0244102 A1 * | 12/2004 | Benzon et al. .................... | 4/420 |
| 2005/0003837 A1 * | 1/2005 | Midkiff et al. ................ | 455/466 |
| 2009/0135765 A1 * | 5/2009 | Lewis et al. .................... | 370/328 |

* cited by examiner

*Primary Examiner* — Kiet Doan
*Assistant Examiner* — Dung Lam
(74) *Attorney, Agent, or Firm* — Arent Fox LLP

(57) ABSTRACT

Provided herein is a system, method and product for performing address translation and routing of short codes. The embodiment described herein primarily supports the wireless and standardized SMS; however, one skilled in the art can readily appreciate that the present invention can also be applied to any mobile messaging technology, e.g., Multimedia Messaging Service ("MMS"), etc.

2 Claims, 4 Drawing Sheets

MOBILE MESSAGING SHORT CODE
TRANSLATION AND ROUTING SYSTEM AND
METHOD

CROSS-REFERENCE TO RELATED
APPLICATIONS

This application is a Continuation of patent application Ser. No. 10/556,963, filed May 7, 2007, now U.S. Pat. No. 8,155,677 now patented; which is a National Stage entry of International Application No. PCT/US2004/015434, having an international filing date of May 17, 2004; which claims priority from Provisional Application No.: 60/471,016, filed May 16, 2003, the disclosures of each of which is hereby incorporated in its entirety by reference.

STATEMENT REGARDING FEDERALLY
SPONSORED RESEARCH OR DEVELOPMENT

Not applicable

REFERENCE OF A "MICROFICHE APPENDIX"

Not applicable

FIELD OF THE INVENTION

This invention relates to data processing and more particularly to wireless and mobile messaging services for enabling translation and routing of any mobile message to the appropriate application, service or function.

BACKGROUND OF THE INVENTION

Messaging technology is a pervasive wireless data technology, Short message services (SMS), and now multimedia service (MMS) are used to support the following types of subscriber data services: Peer-to-peer subscriber text messaging; notifications, such as voice-mail indications, message waiting indications, etc; value-added applications and services. Value added applications and services includes: information services, such as stock quotes, weather reports, sports scores, ring tones, graphics; telemetry and telematics services, such as meter reading, shipment tracking; mobile marketing services, such as branded campaigns, promotions, contests, quizzes, etc.

These data services use different addressing schemes: mobile directory number (MDN) physical (geographical) addresses are typically used for peer-to-peer text messaging and notifications and short code logical addresses are typically used for value-added applications and services.

MDNs are the common mobile phone numbers used for voice calls. In World Zone 1 (primarily the U.S. and Canada), the MDN is required to follow the ten-digit format of the North American Numbering Plan (NANP) which is based on the ITU-T E.164 standard. This format is supported by both GSM networks (as the mobile station integrated services digital network or MSISDN number) and ANSI-41 networks for CDMA and TDMA (as the mobile identification number or MIN).

Short codes are numeric addresses (from 1-20 digits, but typically 4-10 digits) used by wireless carriers to enable access to message based value-added applications and services.

There are still major technical issues to be resolved with the use of short codes. Among the most important of these issues is the short code addressing, translation and routing method used for SMS. Currently, there are major problems with the use of these short codes: short codes are not a standardized address scheme; short codes are used in a proprietary mama by individual wireless carriers; short codes are routed to destinations in a proprietary manner by individual wireless carriers.

The use of common short code (CSC) addresses among wireless carriers is requited for any type of SMS-based value-added application or service that is to extend to users beyond a single wireless carrier's subscriber base. CSCs enable subscribers from any wireless carrier to access the same application or service in the same way from any location, provided that roaming agreements exist. Common short codes are now available in both the U.S. and Canada.

Common short codes enable applications, services and brands the ability to interact with the entire wireless base in a consistent manner. As an example, corporations could implement mobile marketing campaigns or services that included a CSC and be assured that their customers could access these with any wireless phone, regardless of carrier or location.

Today value-added application and service providers either connect themselves directly to wireless carriers, or more commonly through aggregators. This invention applies to both. In addition, aggregators can use this invention internally to route messages to their down stream value-added applications and service providers—that is the aggregator gets traffic from wireless carriers, and it's the aggregator that performs the lookup of the destination address by means of the short code translator.

Currently, each carrier provisions short codes manually, requiring a coordination between the operational teams of the carriers and the operational team of value-added service providers or aggregators.

Currently short codes are logical addresses within the telephony numbering plan. But the application servers tend to be reachable via a data network such as the Internet or the SS7 network. Hence a mechanism is needed to map the short code to physical addresses (like an IP address of an application platform, or the associated network address of the Signal Transfer Point (STP) associated with a Service Control Point (SCP) in the SS7 network) at the SMSC or the Short Message Entity (SME) Gateway of a wireless carrier. Providing some physical meaning to the format of the short code can greatly simplify their use.

One the destination address of the application server in the data network name space is known, the SMSC or Short Message Entity (SME) Gateway can open a messaging connection with the application server by means of one of the many messaging protocols such as Short Message Peer to Peer (SMPP).

Today, the mapping from short code to the application server address in the data network is done manually at each carrier. That is, when a short code is approved, each carrier mamually provisions and tests the correction. This is both expensive in labor as well as time consuming. This approach will not scale as more and more value added services are created. This invention allows for the total automation of this process.

A basic one-to-one correspondence between a single short code and a single high-level application entity may not provide enough utility. Ranges of short codes can be deployed hierarchically to enable application granularity for a variety of services, applications and programs.

SUMMARY DESCRIPTION OF THE INVENTION

Figure 1:
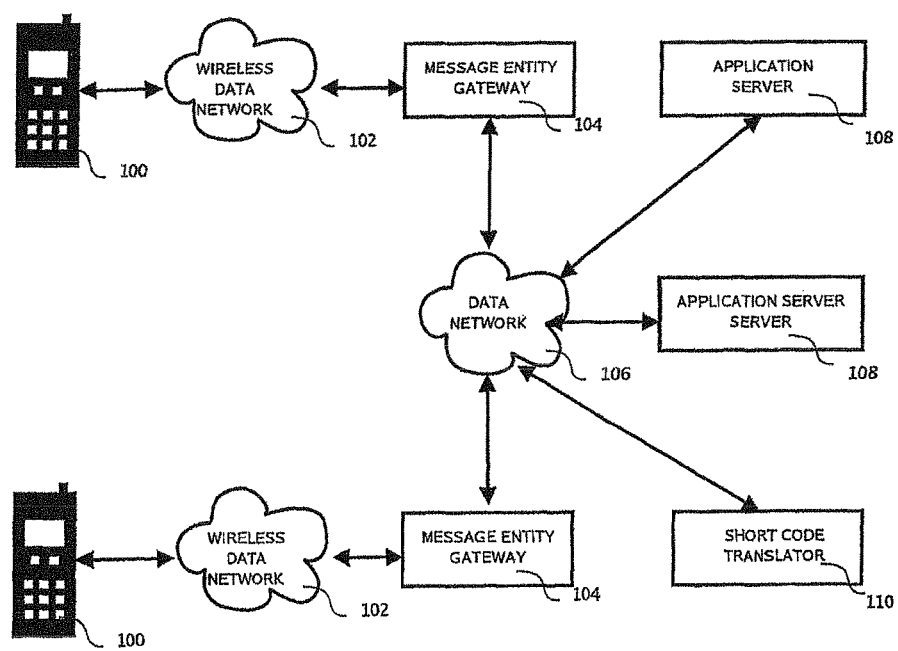
FIG. 1 Exemplary High-Level Architecture of a Common Short Code Address Translation System FIG. 2 Exemplary High-Level Architeeture of a Common Short Code Address Translation Server FIG. 3 Exemplary High-Level Architecture of a Common Short Code Address Translation System used in an Aggregation Context FIG. 4 Exemplary Short Code Address Translation and Routing Flow Chart

Provided herein is a system, method and product for performing address translation and routing of short codes. The embodiment described herein primarily supports the wireless and standardized SMS; however, one skilled in the art can readily appreciate that the present invention can also be applied to any mobile messaging technology, e.g., Multimedia Messaging Service ("MMS"), etc.

According to one aspect of the present invention, a rapid method for issuing, provisioning and rapidly deploying common short codes for use is the deployment of a centralized address translation server.

According to a second aspect of the present invention, if a centralized short code administration service is available, such a system could directly connect to the short code administration service.

According to a third aspect of the present invention, the system would provide for address translation for value-added applications and services. The system deploys one or more robust carrier-grade databases that performs the translation of a short code into a physically routable destination address, such as an Internet Protocol (IP) address. Wireless carrier network gateways could perform a query to the system and receive a response including the routable address for a mobile-originated SMS message. A carrier's gateway could then route the SMS message to the appropriate value-added application.

According to a fourth aspect of the present invention, the system supports various messaging protocols used in the wireless industry for SMS and MMS, including, for example: ANSI-41 SMS; GSM SMS; Short Message Peer-to-Peer (SMPP) protocol; Simple Mail Transfer Protocol (SMTP); Computer Interface for Message Distribution (CIMD) for Nokia SMSCs; Universal Computer Protocol (UCP) for CMG SMSCs; HyperText Transport Protocol (HTTP).

The short code address translation server embodiment has many benefits: it delivers simple provisioning of all short codes into a centralized system. Provisioning consists of a short code and it's associated rentable address. The routable address is obtained from the entity to which the short code was assigned. Further, it delivers carrier independent routing. Short code routing can be performed independent of the wireless carrier delivering the message. This is similar to the use of dialable toll-free 800-numbers. Any subscriber from any wireless carrier can interact with a value-added service regardless of whether they are roaming or not. Each carrier would not have to provision short codes and routing tables. Rather, they perform a simple query and perform routing based on dynamic instructions. Short codes can be made portable and used by any entity providing a value-added application or service. The system can centrally enable or disable access to any value-added application or service that violates short code qualification rules. Short codes can easily be re-claimed, renewed and reissued. The system can provide transaction authorization for short code routing. Applications and services can be granted different statuses (such as active or suspended) and routing can be performed based on these statuses. The system can provide centralized clearinghouse functions between all wireless carriers and application providers. Short codes can be centrally managed, possibly in conjunction with the common short code administrator.

DETAILED DESCRIPTION OF THE INVENTION

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Referring to FIG. 1, an exemplary system illustrating the component of this invention and constructed in accordance with the teachings expressed herein comprises the following components: wireless devices (100), wireless, etworks (102), message entity gateways (104), a data network (106), a plurality of application servers (108), a short code translator (110).

The wireless devices (100), wireless networks (102) and message entity gateways (104) being existing systems providing for one way or two way messaging technologies by wireless service providers. Messages can be exchanged between the wireless devices (100) and application servers (108) by means of a wireless service provider message entity gateway (104). Each wireless service provider operates one or more message entity gateways (104) to provide access to their wireless network and subscribers.

The data network (106) being any data network capable of connecting message entity gateways (104) with application sewers (108). In one exemplary embodiment, the data network is the Internet, using the IP protocol. In one exemplary embodiment, the data network consists of leased data lines.

The application servers (108) host value added services.

In one exemplary implementation the short code translator (110) being programmed to resolve the address of the destination application server (108) in the data network (106) naming space based on the message source and destination address in the Public Switched Telephone Network (PSTN) numbering plan, whereby the message is correctly routed from one message entity gateway (104) to the application server (108).

In one exemplary implementation the short code translator (110) being programmed to resolve the address of the destination message entity gateway (104) based on the message source and destination address he the Public Switched Telephone Network (PSTN) numbering plan, whereby the message is correctly routed from one application server (108) to the message entity gateway (104).

Figure 2:
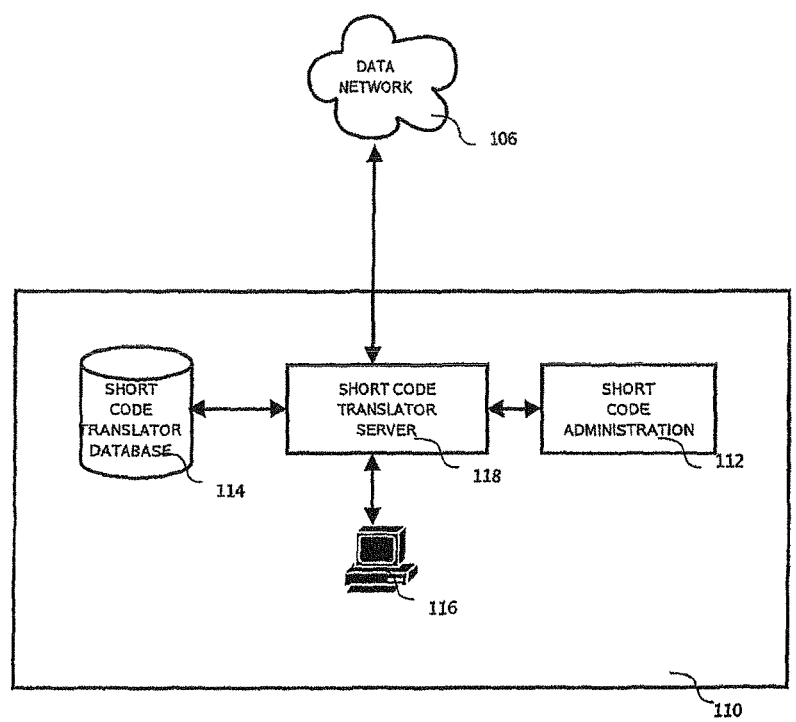

Referring to FIG. 2, an exemplary system illustrating the components of the short code translator (108) and constructed in accordance with the teachings expressed herein comprises the following components: one or more short code translator servers (118), a short code administration system (112), a short code translator database (114).

The short code translator servers (118) being one or more computing devices programmed to support the resolution and administration of message routing. The short code translator servers being accessible for management and administrative access by remote systems (116).

The short code translator database (114) being a database holding short code routing information.

The short code administration system (112) being a system to administer a common pool of short code address. In one exemplary embodiment, the short code administration system being part of the same system as the short code translator (108), as illustrated in FIG. 2. In another exemplary emhodiment, the short code administration system (112) being external and independent of the short code translator (108) and connected to the short code translator server (110) by means of the data network (106).

In one exemplary implementation, the short code translator (110) is queried via the Domain Name System (DNS) protocol. For example, the query could be made against a top level domain set for this purpose like 12345.sc, or 5.43.2.1.sc, which would return a list of IP address of the destination application server (108). In one exemplary implementation, the short code translator (110), is queried via a protocol based on Telephone Number Mapping (ENUM).

In one exemplary implementation, the short code translator (110) has the capability of mapping a whole range of short code to a single application server (108). As an illustrative example, short code address 1234-00 through 1234-99 could map to a unique Internet address 234.255.189.001.

In one exemplary embodiment, the short code translator, in addition to storing a map from short code address to the corresponding data network (106) address of the destination application server (108), also stores an end date for how long the mapping is valid. This enables high performance caching of the translation at multiple points in the network.

In one exemplary embodiment, the short code translator (110) is not a centralized system, but a set of decentralized servers that cache a common short code translation database (114). As an illustrative example, if the short code translator is built using the DNS protocol, such distributed, cached database design is inherent in the DNS design. The availability of multiple decentralized servers provides for greater availability and redundancy. This is similar to the role played by the 13 top-level root DNS servers in DNS.

Figure 3:
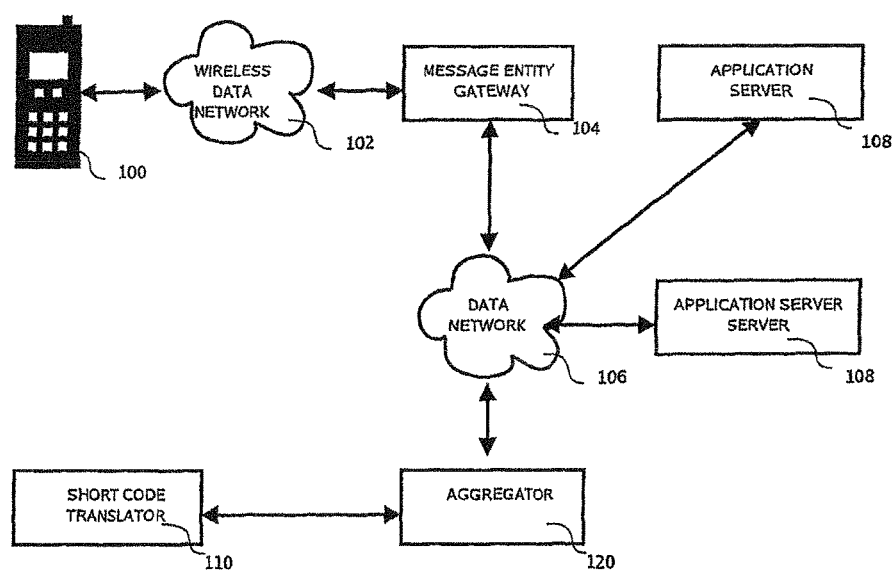

Referring to FIG. 3, an exemplary system illustrating an exemplary embodiment of this invention where message is routed via an aggregator (120). An aggregator is responsible for routing all traffic from application servers (108) to the appropriate message entity gateway (104), based in the subscriber address. In one exemplary embodiment, the aggregator (120) uses the short code translator (110) internally for the application servers connected to the aggregator (120). In another exemplary embodiment, the aggregator (120) administers the short code translator (110) for the application servers connected to the aggregator (120), and makes it available externally to the message entity gateways (104).

Figure 4:
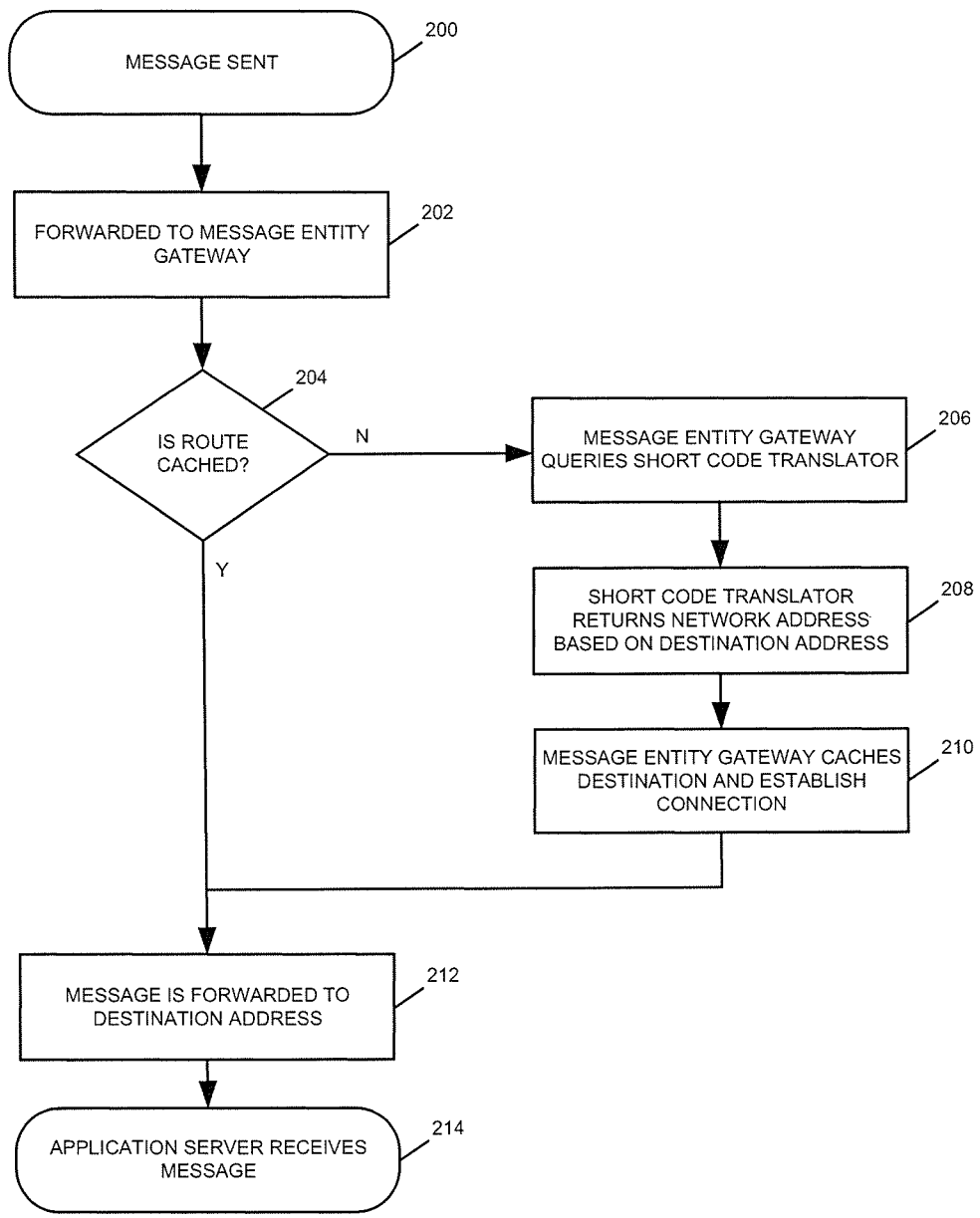

Referring to FIG. 4, there is shown a flow chart of an exemplary embodiment of the routing functionality provided by the short code translator (110). In step 200, the subscriber initiates a mobile-originated message addressed with short code. In step 202, the message is forwarded to the message entity gateway (104) for routing to the message destination by means of the wireless data network (102). In step 204, if the message entity gateway (104) checks if it already knows how to route the mobile-originated message based on the destination service code. If it does, it used the cached destination address in the data network (106) naming space corresponding to the short code, to forward the message to application server (108) and proceeds to step 212. If it does not blow how to route the mobile-originated message, it proceeds to step 206. In step 206, the message entity gateway (104) queries the short code translator passing in the short code. The query is done over the data network (106). In step 208, the short code translator returns a rentable address for the short code in the naming space of the data network (106). In Step 210, the message entity gateway caches the mutable address for future use, and in most eases, establishes a connection between itself and the application servers (110) over data network (106) using the routable address. In step 212, the mobile-originated message is forwarded to the application server (108) by means of data network (106), using the mutable address.

In one exemplary implementation, a similar flow exists for mobile-terminated messages, with the difference that the application server (108) is the system making the query to the short code translator, and the address passed in tire destination subscriber mobile number. The short code translator being further programmed to resolve the message entity gateway address within the data network (106) based on the destination subscriber mobile number.

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative (including any accompanying claims, abstract, and drawings) may be replaced by alternative features serving the same purpose, and equivalents or similar purpose, unless expressly stated otherwise. Therefore, numerous other embodiments of the modifications thereof are contemplated as failing within the scope of the present invention as defined by the appended claims and equivalents thereto.

For example, the techniques may be implemented in hardware or software running on appropriate hardware, such as, for example, the Dell™ PowerEdge 1750 Intel Xeon systems, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language such as Java, to communicate with a computer system, however, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. In a network system comprising at least one mobile device, message entity gateway, short code translator and application server, a method of translating and routing short code addresses, comprising:
   providing a plurality of short codes and corresponding application server destination addresses;
   at said mobile device,
      initiating a mobile-originated message to the application server, said message having a short code; and;
      forwarding the mobile-originated message to the message entity gateway;
   at said message gateway,
      if the corresponding destination address of the short code was previously cached, routing the mobile-originated message to the application server based on the destination address,
      else,
         querying, over a data network, the short code translator with said short code for said corresponding application server destination address,
         receiving the application server destination address for the short code in a naming space of the data network via a return message from the short code translator;
      caching the destination address for future use,
      establishing a connection between the message entity gateway and the application server, and
      routing the mobile-originated message to the application server based on the destination address.

2. In a network system comprising at least one mobile device, message entity gateway, short code translator and application server, a method of translating and routing short code addresses, comprising:
   providing a plurality of short codes and corresponding mobile device destination addresses;
   at said application server,
      initiating an application-originated message to the mobile device, said message having a short code; and;
      forwarding the application-originated message to the message entity gateway;
   at said message gateway,
      if the corresponding destination address of the short code was previously cached, routing the application-originated message to the mobile device based on the destination address,
      else,
         querying, over a data network, the short code translator with said short code for said corresponding mobile device destination address,
         receiving the application server destination address for the short code in a naming space of the data network via a return message from the short code translator;
      caching the destination address for future use,
      establishing a connection between the message entity gateway and the mobile device, and
      routing the application-originated message to the mobile device based on the destination address.

* * * * *